United States Patent [19]

Lövgren et al.

[11] 4,405,553

[45] Sep. 20, 1983

[54] METHOD OF MANUFACTURING A COIL FOR AN ELECTRICAL MACHINE

[75] Inventors: Göran Lövgren; Bengt Rothman, both of Skultuna, Sweden

[73] Assignee: ASEA Aktiebolag, Västerås, Sweden

[21] Appl. No.: 353,389

[22] Filed: Mar. 1, 1982

[30] Foreign Application Priority Data

Mar. 4, 1981 [SE] Sweden .................. 8101400

[51] Int. Cl.³ .......................... B29B 3/00
[52] U.S. Cl. .................. 264/272.19; 264/230; 264/258; 249/112; 249/135; 29/596
[58] Field of Search .............. 249/135, 112, 116; 425/182, 185, 225; 264/313, 316, 129, 272.19, 230, 258; 29/596, 605

[56] References Cited

U.S. PATENT DOCUMENTS

| | | | |
|---|---|---|---|
| 2,336,578 | 12/1943 | Skoning | 249/112 |
| 2,675,421 | 4/1954 | Dexter | 264/258 |
| 2,922,734 | 1/1960 | Kohn | 264/272.19 |
| 3,466,210 | 9/1969 | Wareham | 264/230 |
| 3,474,527 | 10/1969 | Meyer | 29/596 |
| 3,595,953 | 7/1971 | Konishi | 264/230 |
| 3,914,860 | 10/1975 | Schuler | 29/596 |
| 4,229,242 | 10/1980 | Otty | 264/272.19 |

FOREIGN PATENT DOCUMENTS

867763 2/1960 United Kingdom .
939747 11/1961 United Kingdom .

*Primary Examiner*—Donald E. Czaja
*Assistant Examiner*—Joel S. Baden
*Attorney, Agent, or Firm*—Watson, Cole, Grindle & Watson

[57] ABSTRACT

A coil having a slot portion intended to be arranged in slots in a stator or a rotor of an electrical machine is manufactured by forming a coil part including a bundle of electrically insulated conductors and insulation surrounding the bundle, arranging a portion of the coil part in a mould including at least two mould parts, surrounding the mould with a heat-shrinkable material which is penetrable by an impregnating resin, subjecting the thus composed product to pressing and heating in a tool which together with the mould gives the slot portion its final shape, the mould parts being spaced from each other to provide longitudinal gaps between their confronting longitudinal edges, and the heating of the product causing the heat-shrinkable material to shrink and retain the slot portion in its final shape after removal of the composite product from the tool, thereafter impregnating the insulation with an impregnating resin and transforming the insulation into a solid state.

6 Claims, 3 Drawing Figures

U.S. Patent     Sep. 20, 1983     4,405,553
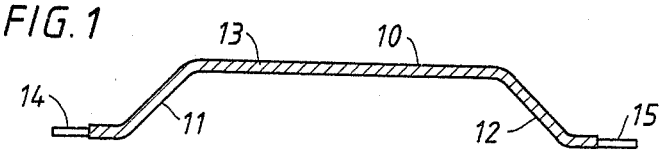
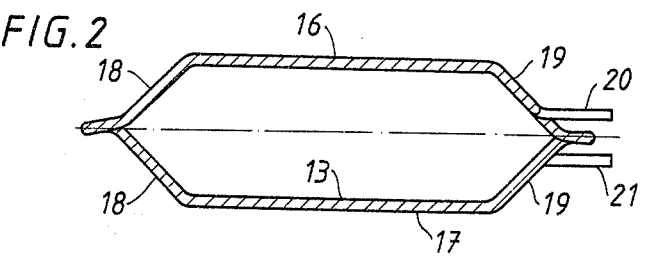
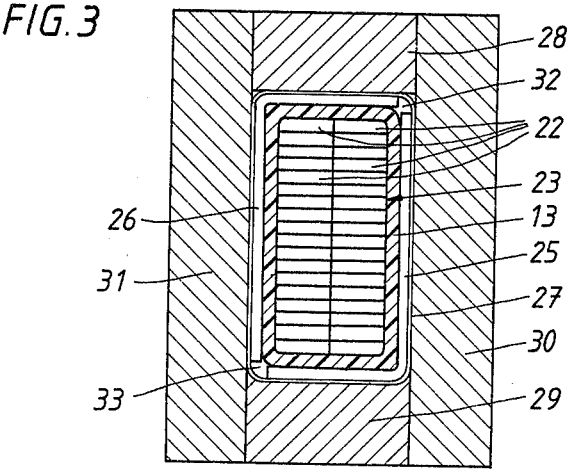

METHOD OF MANUFACTURING A COIL FOR AN ELECTRICAL MACHINE

BACKGROUND OF THE INVENTION

1. Field of the Invention

This invention relates to a method of manufacturing a coil, in particular a high-voltage coil, having at least one slot portion intended to be arranged in a stator or rotor of an electrical machine.

2. Description of the Prior Art

A coil part which is arranged in slots in a stator or a rotor of an electrical machine normally comprises a bundle of a plurality of conductor lengths arranged adjacent each other and provided with a conductor insulation for electrically insulating the conductor lengths from one another. The bundle may consist of turns of a single electrically insulated conductor. It may also consist of several separate electrically insulated conductors, which are electrically connected to one another, usually parallel-connected.

The bundle of conductor lengths is surrounded by an insulation for insulating the bundle from the machine slot which has ground potential. This insulation usually comprises material which has strong resistance to corona attack, for example mica or silicone rubber, and its application around the bundle of conductor lengths normally involves impregnating and pressing operations so that an insulation is obtained which has no voids and which tightly surrounds the bundle of conductor lengths.

British Patent Specification No. 867,763 describes one method of manufacturing a coil for an electrical machine. In this prior specification the slot portion, i.e. the portion of the coil intended to be fitted in a slot of a stator or rotor of an electrical machine, is given its final shape by using a compressible mould consisting of two L-shaped mould parts and a heat-shrinkable tape arranged around the mould. The mould assembly is heated causing the heat-shrinkable tape to compress the L-shaped mould parts so that these make contact with each other and thus form a closed mould cavity of rectangular cross-section. The insulating material surrounding the bundle of conductor lengths may be impregnated with a thermosetting or a thermoplastic impregnating resin. When using a thermosetting impregnating resin, this is supplied to the insulating material around the bundle of conductor lengths before the insulating material is applied around the conductor bundle, that is, before the conductor bundle is arranged in the mould. After the compression of the mould and after the evacuation of the mould with its contents, the thermosetting impregnating resin is cured with a heated liquid pressure medium, such as molten asphalt, which is arranged around the mould and the heat-shrinkable tape. Since the heat-shrinkable tape is applied as a tight joint, the pressure medium does not penetrate into the insulation. When using a thermoplastic impregnating resin, the insulating material is applied around the bundle of conductor lengths in an unimpregnated state. After compression of the mould in the manner described above, and evacuation thereof, the thermoplastic impregnating resin is in this case arranged around the mould and the shrinkable tape and the impregnation takes place while the thermoplastic impregnating resin is maintained under pressure.

In the prior art method described above, it is the L-shaped mould parts inside the heat-shrinkable tape that give the coil part intended to be fitted in the machine slot its final shape. This means that great demands are placed on the dimensional stability of the mould parts. In particular the mould parts need to be made of thick, relatively expensive material which, in order to be economic, have to be re-used. However, this means that the mould parts have to be subjected to cleaning processes between moulding operations. Since the mould parts in compressed state form a closed mould cavity, the mould offers a considerable resistance to the supply of an impregnating resin to the conductor bundle and its insulation after compression of the mould. The same is true of the tight joint of the heat-shrinkable tape.

The present invention aims to overcome the disadvantages described above.

SUMMARY OF THE INVENTION

According to the present invention a method of manufacturing a coil having a slot portion intended to be arranged in a slot in a stator or rotor of an electrical machine, comprises forming a coil part comprising a bundle of electrically insulated conductor lengths arranged close together and insulation surrounding the bundle, arranging a portion of the coil part destined to form the slot portion in a compressible mould having at least two mould parts, surrounding the mould with a heat-shrinkable material, which is penetrable by an impregnating resin, to form a mould assembly, pressing and heating the mould assembly so that the coil part portion is pressed by the mould parts into a desired final shape with the mould parts being spaced from each other so as to provide longitudinal gaps between confronting longitudinal edges thereof and so that the heat-shrinkable material is caused to shrink, the shrunk material maintaining the coil part portion in its desired final shape after removal of the application of the heat and pressure to the mould assembly, impregnating the insulation of the mould assembly with impregnating resin, transforming the impregnating resin into a solid state in the insulation, and removing the mould parts and heat-shrinkable material to provide the coil with the slot portion.

By employing the method according to the invention for manufacturing a coil it is possible to use simple mould parts, for example in the form of metallic sheets or plates, inside the heat shrinkable material. By arranging the mould parts with longitudinal gaps between them, the supply of impregnating resin to the insulation of the slot portion is significantly facilitated. Furthermore, the use of a heat shrinkable material which is penetrable by the impregnating resin also facilitates the impregnation of the insulation with the impregnating resin.

As a heat-shrinkable material there may be used with advantage woven tapes or sheets of polymer fibres, such as fibres of polyethylene glycol terephthalate, polyamide, polyacrylic nitride, polyvinylidene chloride and polypropylene. It is also possible to use films of the exemplified polymers if the films are applied with spaces between adjacently arranged turns of the film or if they are perforated to let through the impregnating resin.

BRIEF DESCRIPTION OF THE DRAWINGS

The invention will now be described in greater detail, by way of example, with reference to the accompanying drawings, in which:

FIG. 1 is a side view of a coil wound with an electrically insulating material,

FIG. 2 is a side view of another coil wound with an electrically insulating material, and FIG. 3 is a cross-sectional view, on a larger scale, of a slot portion of either of the coils shown in FIGS. 1 and 2, arranged in a pressing tool.

DESCRIPTION OF THE PREFERRED EMBODIMENTS

In FIG. 1 there is shown a coil having a straight slot portion 10 intended to be located in the slots of a rotor or a stator of an electrical machine (not shown), and end portions 11 and 12 which are intended to be located outside the machine slots. The coil is provided with a solid, electrically insulating material consisting of a wrapping 13 of mica tape. The terminals of the coil are designated 14 and 15.

In FIG. 2 there is shown a coil having two straight slot portions 16 and 17 intended to be placed in the slots of a rotor or a stator of an electrical machine, and bent end portions 18 and 19 which are intended to be located outside the machine slots. The coil is provided with a solid electrically insulating material which, in this case, also consists of a wrapping of mica tape and is designated 13. The terminals of the coil are designated 20 and 21.

Each of the coils shown in FIGS. 1 and 2 is manufactured by bending an electrically insulated conductor so that the bent product comprises several turns 22 of the conductor positioned adjacent to one another in two rows, as shown in FIG. 3. The adjacently positioned turns of the conductor form a conductor bundle 23 of the coil. The conductor lengths in the conductor bundle are as usual electrically insulated from one another by a conductor insulation (not shown) which, for example, may consist of a wrapping of glass yarn around the conductor, which glass yarn has been impregnated with a binder, for example an epoxy resin. As previously mentioned, the conductor bundle 23 is provided with a surrounding electrical insulation 13 consisting of a wrapping of a mica tape. The mica tape may consist of a self-supporting layer of small mica flakes which overlap each other and are fixed to a woven glass fiber tape with a thin film of polyethylene glycol terephthalate. Such a mica tape is disclosed in British patent Specification No. 939,747. Around each slot portion in the conductor bundle 23 provided with electrical insulation 13 there is arranged, in the longitudinal direction of the bundle, two L-shaped mould pieces 25 and 26 of sheet steel, the mould pieces 25 and 26 being positioned so that their longitudinal edges are spaced apart from each other. Around these mould pieces 25 and 26 there is wound a tape 27, woven of fibers of polyethylene glycol terephthalate, which is capable of shrinking during heating.

The product composed in this manner is arranged with its, or one of its, slot portion(s) in a tool in a heating press. The tool comprises two spaced apart and mutually parallel bars 28 and 29 movable towards and away from each other in a first direction and two other spaced apart and mutually parallel bars 30 and 31 movable towards and away from each other in a second direction perpendicular to the first direction. The composed product is maintained at a temperature of approximately 175° C. for a few minutes in the tool and is compressed to such an extend that the bars 28 and 29 make contact with the bars 30 and 31 thereby pressing the product into a desired final form having a rectangular cross-section. The heating of the composed product causes the heat-shrinkable tape 27 to shrink around the pressed product and, when the product is withdrawn from the tool, the shrunk tape 27 ensures that the product maintains its shape in its desired final form. The L-shaped mould pieces 25 and 26 together form a mould cavity in the compressed product with the same dimensions as the slot portion of the finished coil. However the mould is "open" by virtue of the fact that the L-shaped pieces 25 and 26, when the composed product is compressed by the bars 28 to 31, are not pressed against each other but remain sufficiently spaced apart for longitudinal gaps 32 and 33 to be provided between confronting longitudinal edges of the mould pieces 25 and 26.

After withdrawal of the compressed product from the tool, it is placed in an impregnating vessel. There it is first dried at a pressure of 0.1 mm Hg and at a temperature of 40° C., whereafter an impregnating resin is supplied at the same pressure. When all the impregnating resin has been supplied, the pressure is raised to, for example, 2500 kPa (25 kg/cm$^2$). The impregnating resin may consist of an epoxy resin consisting, for example, of 85 parts of "Araldite F" ®, 100 parts of "Hardener 905" (both from Ciba AG, Switzerland), and 15 parts of phenyl glycidyl ether. After impregnation, the resin impregnated product is cured in a furnace at a temperature of 160° C. for a period of from 6 to 8 hours. After removal of the heat-shrunk tape 27 and the L-shaped peices 25 and 26 from the cured product, the finished coil is placed with the straight slot portions in the slots of an electrical machine while the end portions, which are impregnated and cured simultaneously with the slot portions, extend outside the slots. The mould pieces 25 and 26 can be discarded as they are normally relatively inexpensive.

Instead of the described mica tape, other solid insulating materials, for example mica tape with large mica flakes, may be used around the conductor bundle. Instead of the described impregnating resin, other commercially available, completely polymerizable resins such as other epoxy resins and polyester resins, may be used.

the method of manufacturing a coil described above may be modified in many ways within the scope of the following claims.

What is claimed is:

1. A method of manufacturing a coil having a slot portion intended to be arranged in a slot in a stator or rotor of an electrical machine, comprising:
    forming a coil part comprising a bundle of electrically insulated conductor lengths arranged close together and insulation surrounding the bundle;
    arranging a portion of the coil part destined to form the slot portion in a compressible mould having at least two mould parts;
    surrounding the mould with a heat-shrinkable material, which is penetrable by an impregnating resin, to form a mould assembly;
    pressing and heating the mould assembly so that said coil part portion is pressed by the mould parts into a desired final shape with the mould parts being spaced from each other so as to provide longitudinal gaps between confronting longitudinal edges thereof and so that the heat-shrinkable material is caused to shrink, the shrunk material maintaining the coil part portion in its desired final shape after removal of the application of the heat and pressure to the mould assembly;

impregnating said insulation of the mould assembly with said impregnating resin;

transforming the impregnating resin into a solid state in said insulation; and removing the mould parts and heat-shrinkable material to provide said coil with said slot portion.

2. A method according to claim 1, wherein said heat-shrinkable material comprises a woven product of polymer fibers.

3. A method according to claim 1, wherein said heat-shrinkable material comprises a polymer film.

4. A method according to claim 1, wherein said mould parts are made of sheet metal.

5. A method according to claim 1, wherein said heating and pressing of the mould assembly are performed in a heating press.

6. A method according to claim 5, wherein the heating press includes tool means comprising a first pair of spaced apart bar means for pressing against a first pair of opposed parallel sides of the mould assembly and a second pair of spaced apart bar means for pressing against a second pair of opposed parallel sides of the mould assembly.

* * * * *